US012646853B2

(12) United States Patent
Rigelsford

(10) Patent No.: US 12,646,853 B2
(45) Date of Patent: Jun. 2, 2026

(54) ADAPTIVE MULTIPATH CONTROL WITHIN AN ELECTRIC VEHICLE BATTERY PACK

(71) Applicant: LITHIUM BALANCE A/S, Herlev (DK)

(72) Inventor: Jonathan M. Rigelsford, Sheffield (GB)

(73) Assignee: LITHIUM BALANCE A/S, Herlev (DK)

( * ) Notice: Subject to any disclaimer, the term of this patent is extended or adjusted under 35 U.S.C. 154(b) by 876 days.

(21) Appl. No.: 17/799,467

(22) PCT Filed: Feb. 12, 2021

(86) PCT No.: PCT/US2021/017975
§ 371 (c)(1),
(2) Date: Aug. 12, 2022

(87) PCT Pub. No.: WO2021/163576
PCT Pub. Date: Aug. 19, 2021

(65) Prior Publication Data
US 2023/0072865 A1 Mar. 9, 2023

Related U.S. Application Data

(60) Provisional application No. 62/976,785, filed on Feb. 14, 2020.

(51) Int. Cl.
*H01Q 15/00* (2006.01)
*H01M 10/42* (2006.01)
(Continued)

(52) U.S. Cl.
CPC ...... *H01Q 15/0066* (2013.01); *H01M 10/425* (2013.01); *H01Q 1/3233* (2013.01);
(Continued)

(58) Field of Classification Search
CPC ............. H01Q 15/0066; H01Q 1/3233; H01Q 19/104; H01M 10/425; H01M 2010/4271;
(Continued)

(56) References Cited

U.S. PATENT DOCUMENTS 10,411,306 B2 9/2019 Kim et al.
11,018,381 B2 5/2021 Dawley
(Continued)

FOREIGN PATENT DOCUMENTS

CN 102831459 A 12/2012
CN 206364145 U 7/2017
(Continued)

OTHER PUBLICATIONS

Alonso et al., "Towards a Wireless Battery Management System: Evaluation of Antennas and Radio Channel Measurements Inside a Battery Emulator," 2014 IEEE 80th Vehicular Technology Conference (VTC2014-Fall), XP055293819, DOI: 10.1109/VTCFall.2014. 6966212, ISBN: 978-1-4799-4449-1, Sep. 1, 2014, 5 pages.
International Search Report and Written Opinion, PCT/US2021/ 017975, May 11, 2011, 12 pages.
(Continued)

*Primary Examiner* — Michael C Zarroli

(57) ABSTRACT

Embodiments for adaptive multipath control within an electric vehicle battery pack are disclosed. In a particular embodiment, a method for adaptive multipath control includes modifying at least one of: one or more transmission properties and one or more reflection properties of a meta-surface of a module measurement system of a battery management system. In this embodiment, the metasurface is proximate to an antenna of the module measurement system. The method also includes transmitting, via the antenna of the module measurement system, battery sensor data.

17 Claims, 6 Drawing Sheets

(51) Int. Cl.
 *H01Q 1/32*   (2006.01)
 *H01Q 19/10*   (2006.01)

(52) U.S. Cl.
 CPC .. *H01Q 19/104* (2013.01); *H01M 2010/4271*
  (2013.01); *H01M 2010/4278* (2013.01); *H01M*
           *2220/20* (2013.01)

(58) Field of Classification Search
 CPC ...... H01M 2010/4278; H01M 2220/20; Y02E
           60/10; H04B 7/06
 See application file for complete search history.

(56)       References Cited

U.S. PATENT DOCUMENTS

| | | |
|---|---|---|
| 2014/0365065 A1 | 12/2014 | Léonard et al. |
| 2018/0351250 A1 | 12/2018 | Achour et al. |
| 2020/0006988 A1* | 1/2020 | Leabman ................ A61B 8/56 |

FOREIGN PATENT DOCUMENTS

| | | |
|---|---|---|
| EP | 3536542 A1 | 9/2019 |
| JP | 2019126227 A | 7/2019 |
| WO | 2019017991 A1 | 1/2019 |
| WO | 2019060782 A1 | 3/2019 |

OTHER PUBLICATIONS

Naqvi Aqeel Hussain et al., "A Beam-Steering Antenna With a Fluidically Programmable Metasurface", IEEE Transactions on Antennas and Propagation, IEEE Service Center, Piscataway, NJ, US, vol. 67, No. 6, Jun. 1, 2019 (Jun. 1, 2019), pp. 3704-3711, XP011727790, ISSN: 0018-926X, DOI: 10.1109/TAP.2019. 2905690 [retrieved on May 30, 2019].

Zeng et al., "Solution for Overcoming Interference—Radiation Pattern Reconfigurable Antennas", 2018 International Conference on Electromagnetics in Advanced Applications (ICEAA), IEEE, Sep. 10, 2018 (Sep. 10, 2018), pp. 961-965, XP033436306, DOI: 10.1109/ICEAA.2018.8520410 [retrieved on Nov. 1, 2018].

* cited by examiner

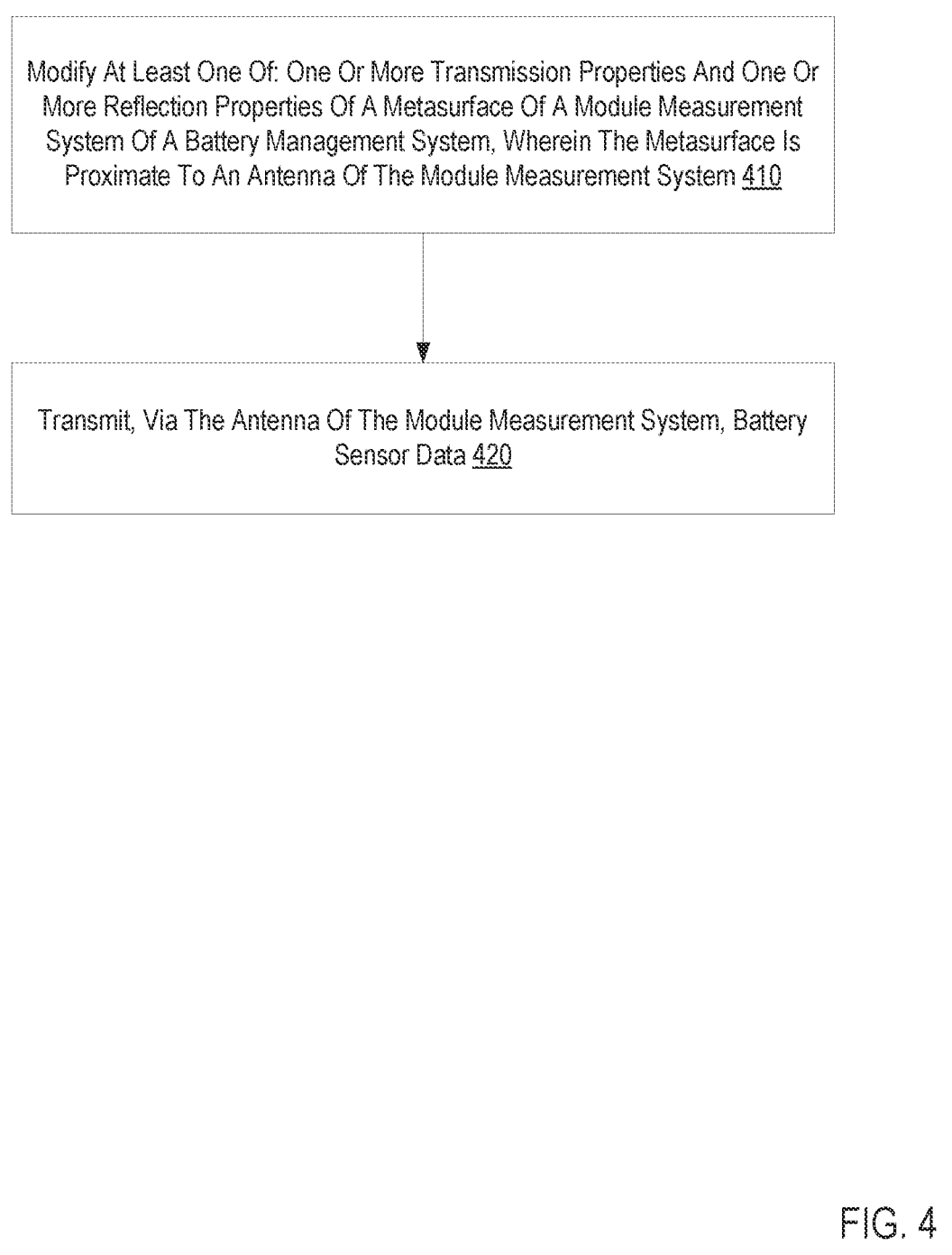

Modify At Least One Of: One Or More Transmission Properties And One Or More Reflection Properties Of A Metasurface Of A Module Measurement System Of A Battery Management System, Wherein The Metasurface Is Proximate To An Antenna Of The Module Measurement System 410

Transmit, Via The Antenna Of The Module Measurement System, Battery Sensor Data 420

FIG. 4

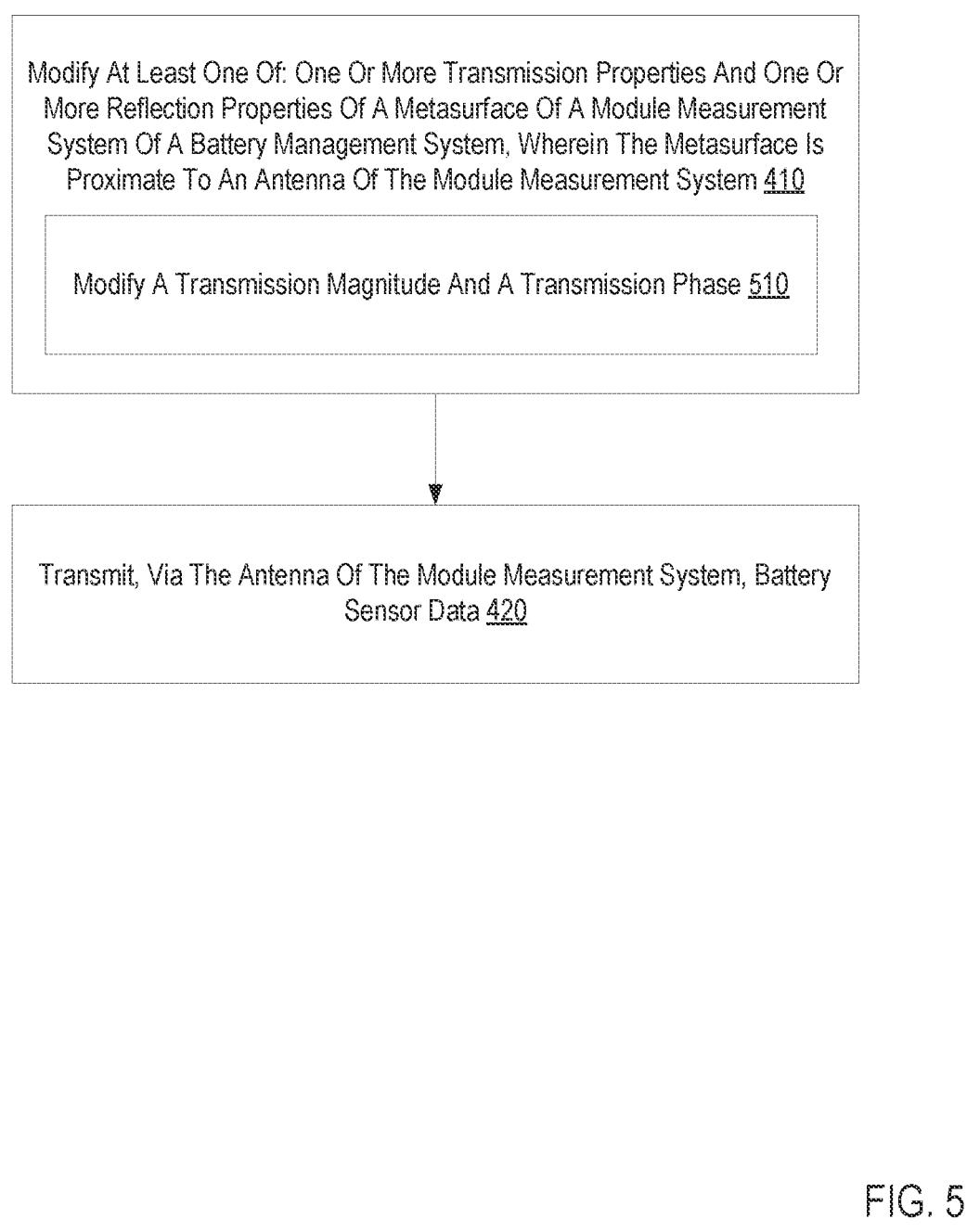

Modify At Least One Of: One Or More Transmission Properties And One Or More Reflection Properties Of A Metasurface Of A Module Measurement System Of A Battery Management System, Wherein The Metasurface Is Proximate To An Antenna Of The Module Measurement System 410

Modify A Transmission Magnitude And A Transmission Phase 510

Transmit, Via The Antenna Of The Module Measurement System, Battery Sensor Data 420

FIG. 5

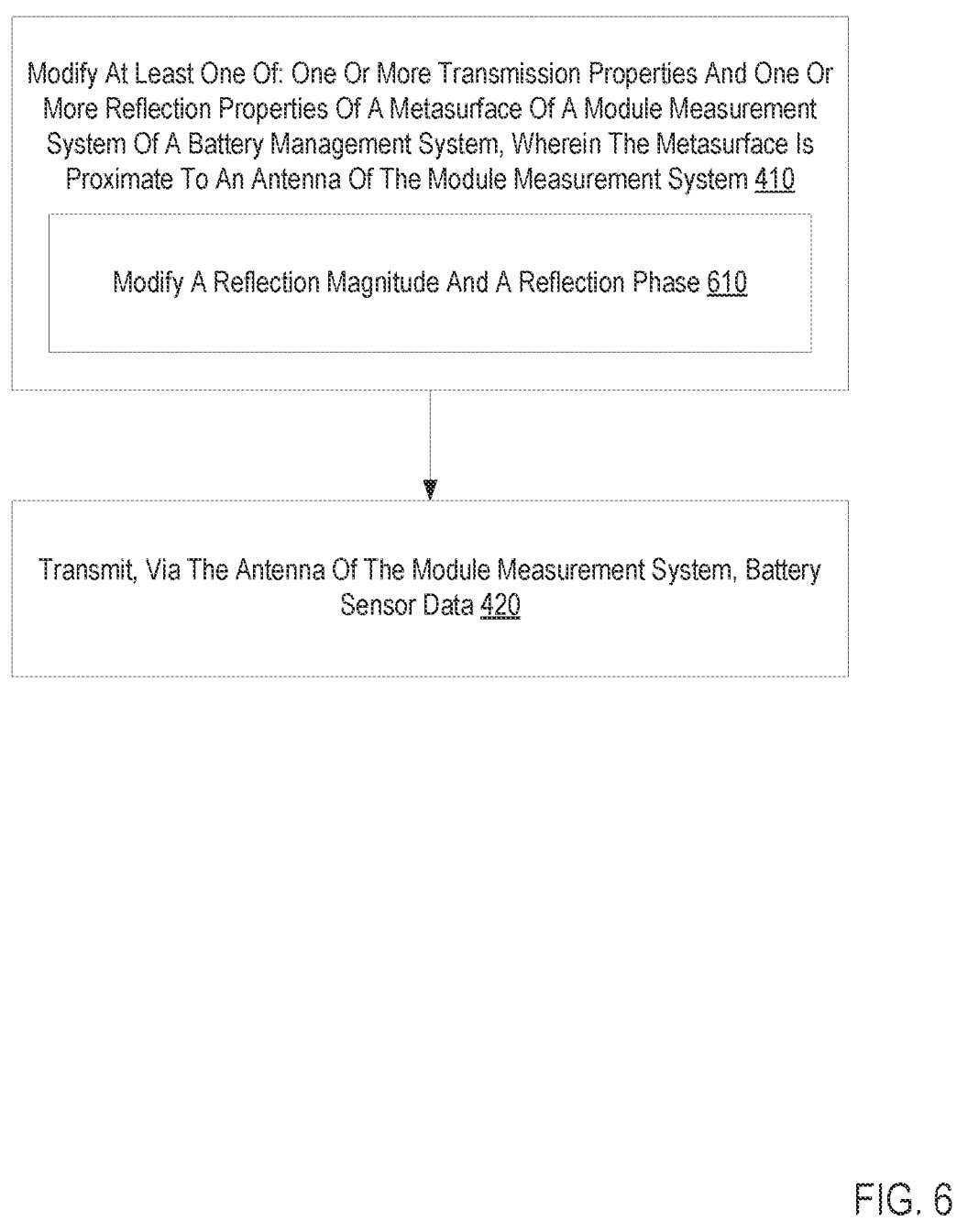

Modify At Least One Of: One Or More Transmission Properties And One Or More Reflection Properties Of A Metasurface Of A Module Measurement System Of A Battery Management System, Wherein The Metasurface Is Proximate To An Antenna Of The Module Measurement System 410

Modify A Reflection Magnitude And A Reflection Phase 610

Transmit, Via The Antenna Of The Module Measurement System, Battery Sensor Data 420

FIG. 6

ADAPTIVE MULTIPATH CONTROL WITHIN AN ELECTRIC VEHICLE BATTERY PACK

BACKGROUND

Vehicle sensor systems often use wireless communication to facilitate communication between vehicle sensors and control systems. For example, sensors of a module measurement system collect data describing the health of a battery (e.g., temperature and voltage) and wirelessly transmit the data to a wireless network controller of a battery management system. The wireless network controller may then send the data to a vehicle's battery management system. As the density of cells and/or modules increase within a battery pack of the vehicle, the space for radio propagation is reduced. Thus, it would be advantageous to overcome these limited radio propagation paths.

SUMMARY

Embodiments in accordance with the present invention are directed to adaptive multipath control within an electric vehicle battery pack, particularly with respect to communications between a module measurement system (MMS) and a wireless network controller (WNC) of a battery management system (BMS). A BMS for a vehicle (e.g., automobiles, heavy vehicles, off road vehicles, etc.) may include one or more battery module measurement systems (MMSs) that measure battery cell voltage and temperature and transmit the measurement data over a wireless (e.g., radio frequency) link to a wireless network controller (WNC). In turn, the WNC may send the collated cell voltage and temperature data to the vehicle's BMS control unit. As the density of cells and/or modules increase within a battery pack of the vehicle, the space for radio propagation is reduced. This reduced space results in an electromagnetic (EM) reverberant environment where standing waves can be established, resulting in areas of higher and lower signal strength. To control an electromagnetic radio multipath of the MMSes, one or more transmission properties or reflection properties of a metasurface of the MMS is modified. For example, one or more of: a transmission phase, transmission magnitude, reflection phase, and a reflection magnitude may be modified. Thus the metasurface changes the radio propagation path within the battery pack to ensure that the antennas on each MMS are not within a null (local minima) in the electromagnetic field pattern.

In a particular embodiment, a method for adaptive multipath control includes modifying at least one of: one or more transmission properties and one or more reflection properties of a metasurface of a module measurement system of a battery management system. In this embodiment, the metasurface is proximate to an antenna of the module measurement system. The method also includes transmitting, via the antenna of the module measurement system, battery sensor data.

In a particular embodiment, a battery management system for adaptive multipath control within an electric vehicle battery pack is disclosed. The battery management system includes a wireless network controller and a module measurement system. In this embodiment, the MMS is configured to perform steps comprising modifying at least one of: one or more transmission properties and one or more reflection properties of a metasurface proximate to an antenna; and transmitting, via the antenna to the wireless network controller, battery sensor data.

In another embodiment, an apparatus for adaptive multipath control within an electric vehicle battery pack. The apparatus includes a computer processor and a computer memory operatively coupled to the computer processor. In this example embodiment, the computer memory has disposed within it computer program instructions that, when executed by the computer processor, cause the apparatus to carry out the steps of: modifying at least one of one or more transmission properties and one or more reflection properties of a metasurface of a module measurement system of a battery management system, wherein the metasurface is proximate to an antenna of the module measurement system; and transmitting, via the antenna of the module measurement system, battery sensor data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF DRAWINGS

FIG. 4 sets forth a flow chart illustrating an example method for adaptive multipath control within an electric vehicle battery pack according to at least one embodiment of the present disclosure;

FIG. 5 sets forth a flow chart illustrating another example method for adaptive multipath control within an electric vehicle battery pack according to at least one embodiment of the present disclosure; and FIG. 6 sets forth a flow chart illustrating another example method for adaptive multipath control within an electric vehicle battery pack according to at least one embodiment of the present disclosure.

DESCRIPTION OF EMBODIMENTS

Figure 1:
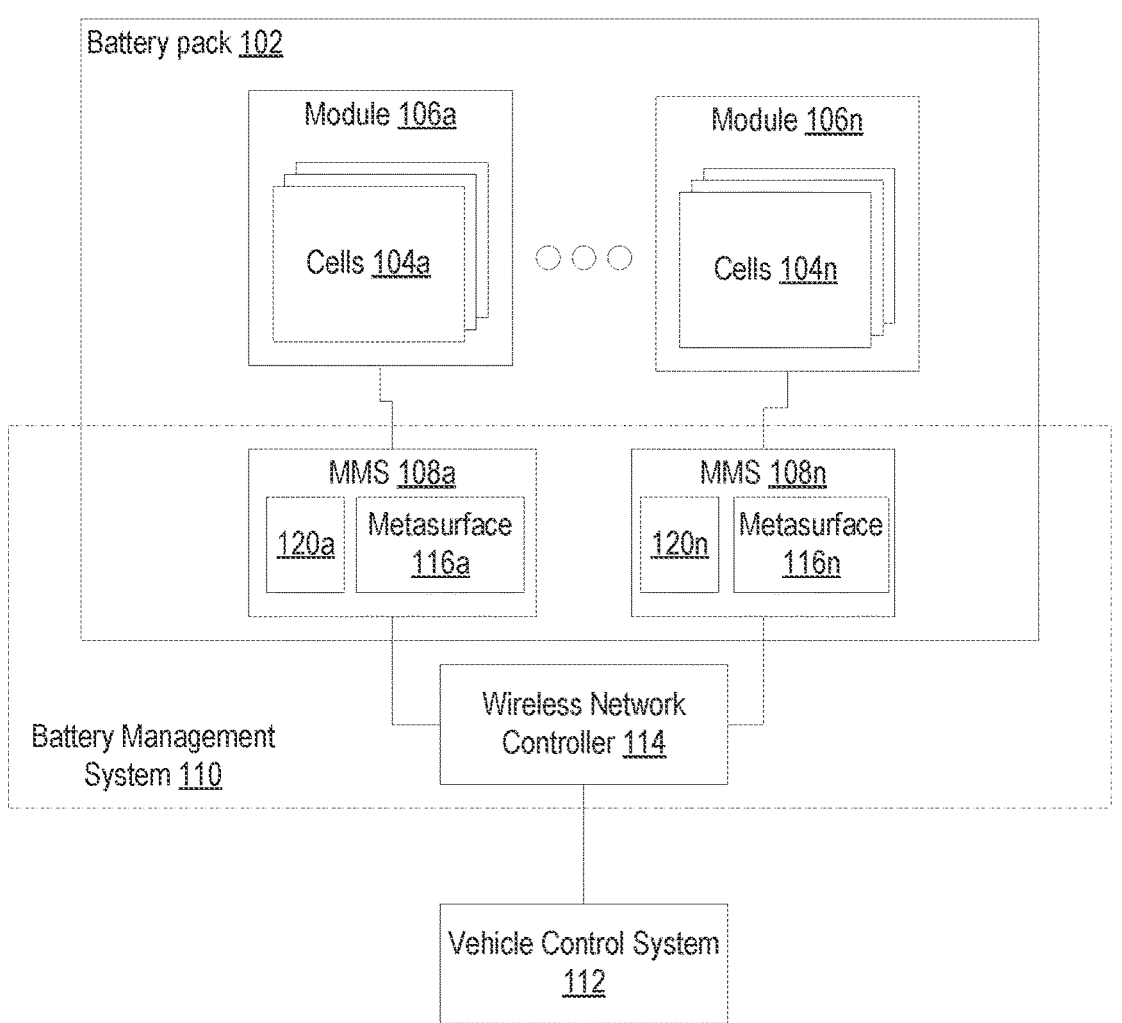
FIG. 1 sets forth a diagram illustrating an example system for adaptive multipath control within an electric vehicle battery pack according to at least one embodiment of a present disclosure.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

FIG. 1 sets forth a diagram of a system for adaptive multipath control within an electric vehicle battery pack according to at least one embodiment of the present disclosure. The system includes a battery pack (102), such as a high voltage battery for use in an electric vehicle. The battery pack (102) includes a plurality of cells (104*a-n*), such as Lithium-ion (Li-ion) cells. The cells (104*a-n*) are grouped into modules (106*a-n*) such that each module (106*a-n*) comprises a corresponding subset of the cells (104*a-n*). The cells (104*a-n*) may be physically grouped into modules (106*a-n*) using a casing, chassis, or other enclosure. The cells (104*a-n*) may also be logically grouped into modules (106*a-n*) by virtue of distinct groupings of cells (104*a-n*) being monitored by a distinct module measurement system (108*a-n*), as will be described below.

The system also includes a battery management system (110). The battery management system (110) monitors various attributes of the cells (104*a-n*) and provides battery sensor data indicating these attributes to a vehicle control system (112). The battery management system (110) includes a plurality of module measurement systems (MMS) (108*a-n*). Each MMS (108*a-n*) is configured to monitor a corresponding module (106*a-n*) of cells (104*a-n*). For example, each module (106*a-n*) may have a MMS (108*a-n*)

attached to a chassis, base, tray, or other mechanism holding the cells (104*a-n*) of the module (106*a-n*). Each MMS (108*a-n*) includes sensors to measure various attributes of the cells (104*a-n*) of its corresponding module (106*a-n*). Such attributes may include voltage, current, temperature, and potentially other attributes. The attributes are indicated in battery sensor data generated by the MMS (108*a-n*).

Each MMS (108*a-n*) encodes its battery sensor data for transmission as a wireless signal and transmits its battery sensor data to a wireless network controller (WNC) (114) via a wireless channel (e.g., a 2.4 Ghz wireless channel). The WNC (114) then sends the battery sensor data received from the MMSes (108*a-n*) to a vehicle control system (VCS) (112) using a wired or wireless communications channel. The VCS (112) may include a central "computer" of a vehicle. The VCS (112) may be a central control unit or may refer collectively to one or more vehicle subsystems.

As the density of cells (104*a-n*) and/or modules (106*a-n*) increases within the battery pack (102), the space for radio propagation is reduced. This results in an electromagnetic (EM) reverberant environment where standing waves can be established, resulting in areas of higher and lower signal strength. To control an electromagnetic radio multipath of the MMSes (108*a-n*), each MMS (108*a-n*) includes a metasurface (116*a-n*). The metasurface (116*a-n*) changes the radio propagation path within the battery pack to ensure that the antennas (120*a-n*) on each MMS (108*a-n*) are not within a null (local minima) in the electromagnetic field pattern.

Figure 2A:
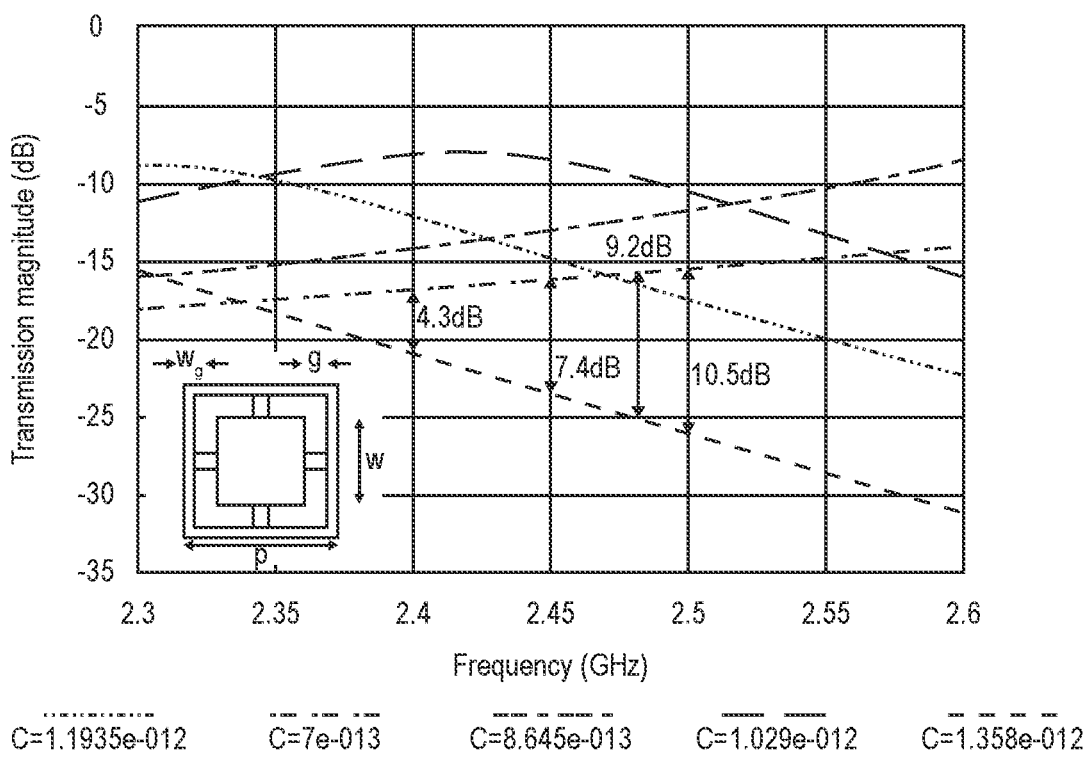
FIG. 2A sets forth a graph of transmission magnitude of a metasurface for adaptive multipath control within an electric vehicle battery pack according to at least one embodiment of the present disclosure.
Figure 2B:
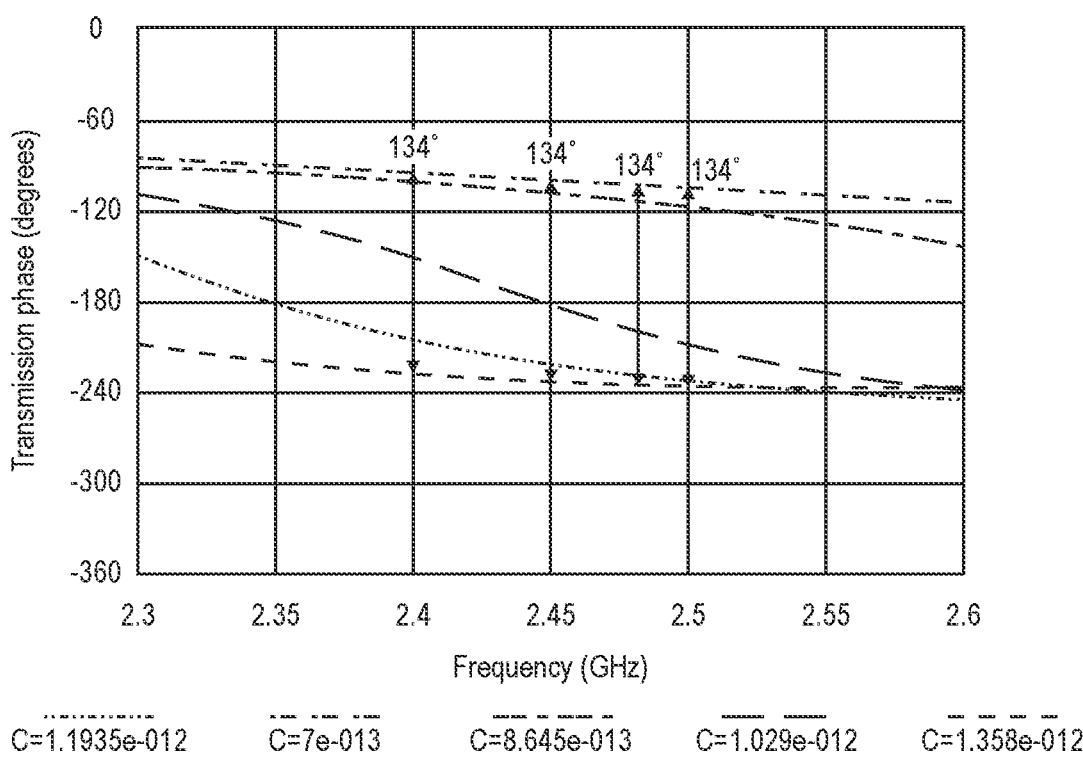
FIG. 2B sets forth a graph of transmission phase of a metasurface for adaptive multipath control within an electric vehicle battery pack according to at least one embodiment of the present disclosure.
Figure 3:
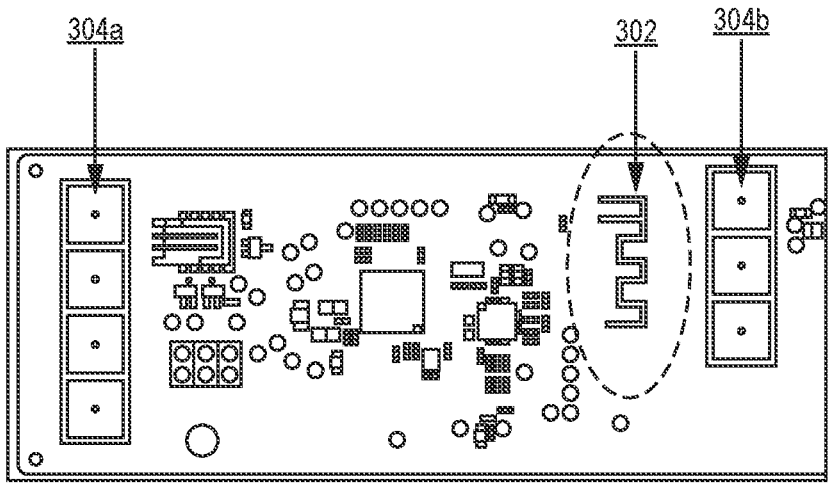
FIG. 3 sets forth a diagram of an example metasurface and antenna placement in a module measurement system for adaptive multipath controls within an electric vehicle battery pack according to at least one embodiment of the present disclosure.

The metasurface (116*a-n*) may comprise an electro band-gap material comprising a plurality of unit cells. Each unit cell may be controlled (e.g., by a controller of a respective MMS (108*a-n*)) to change the transmission magnitude (see FIG. 2A) and transmission phase (see FIG. 2B) of the metasurface (116*a-n*). For example, varying the capacitance of a varactor diode coupled to the metasurface (116*a-n*) may modify the transmission magnitude and phase of the metasurface (116*a-n*). In some embodiments, reflection properties of the metasurface (116*a-n*) are modified. For example, magnitude and phase switching may be achieved using a PIN diode (e.g., by varying an on/off state or attenuated/unattenuated state of the PIN diode). By controlling the transmission and reflection properties of the metasurface (116*a-n*) that is near the antenna on the MMS (108*a-n*), the signal at the antenna is varied to prevent the antenna from being positioned in a null (local minima) and unable to communicate with the WNC (114). For example, as seen in FIG. 3, metasurface cells (304*a,b*) are placed relative to antenna (302) to change the propagation path of signals from the antenna (302). The transmission and reflection properties of the metasurface (116*a-n*) may be modulated in response to a failed transmission by an MMS (108*a-n*), based on predefined modulation patterns over time, or based on other criteria.

For further explanation, FIG. 4 sets forth a flow chart of an example method for adaptive multipath control within an electric vehicle battery pack according to embodiments of the present disclosure. The method of FIG. 4 includes modifying (410) (e.g., by an MMS (108*a-n*)) at least one of: one or more transmission properties and one or more reflection properties of a metasurface (116*a-n*) of a MMS (108*a-n*) of a battery management system (110), wherein the metasurface (116*a-n*) is proximate to an antenna of the MMS (108*a-n*). The metasurface (116*a-n*) changes the radio propagation path within the battery pack to ensure that antennas on each MMS (108*a-n*) are not within a null (local minima) in the electromagnetic field pattern. The metasurface (116*a-n*) may comprise an electro band-gap material comprising a plurality of unit cells. By controlling the transmission and reflection properties of the metasurface (116a-n) near to the antenna on the MMS (108a-n), the signal at the antenna is varied to prevent the antenna from being sat in a null (local minima) and unable to communicate with the WNC (114). The transmission and reflection properties of the metasurface (116a-n) may be modulated in response to a failed transmission by an MMS (108a-n), based on predefined modulation patterns over time, or based on other criteria as can be appreciated.

The method of FIG. 4 also includes transmitting (420), via the antenna of the MMS (108a-n), battery sensor data. Each MMS (108a-n) includes sensors to measure various attributes of the cells (104a-n) of its corresponding module (106a-n). Such attributes may include voltage, current, temperature, and potentially other attributes. The attributes are indicated in battery sensor data generated by the MMS (108a-n). Each MMS (108a-n) encodes its battery sensor data for transmission as a wireless signal and transmits its battery sensor data to a wireless network controller (WNC) (114) (e.g., a 2.4 Ghz wireless channel). The WNC (114) then sends the battery sensor data received from the MMSes (108a-n) to a vehicle control system (VCS) (112) using a wired or wireless communications channel.

For further explanation, FIG. 5 sets forth a flow chart of another example method for adaptive multipath control within an electric vehicle battery pack according to embodiments of the present disclosure. The method of FIG. 5 is similar to FIG. 4 in that the method of FIG. 5 includes modifying (410) (e.g., by an MMS (108a-n)) at least one of: one or more transmission properties and one or more reflection properties of a metasurface (116a-n) of a MMS (108a-n) of a battery management system (110), wherein the metasurface (116a-n) is proximate to an antenna of the MMS (108a-n); and transmitting (420), via the antenna of the MMS (108a-n), battery sensor data.

The method of FIG. 5 differs from FIG. 4 in that modifying (410) (e.g., by an MMS (108a-n)) at least one of one or more transmission properties and one or more reflection properties of a metasurface (116a-n) of a MMS (108a-n) of a battery management system (110), wherein the metasurface (116a-n) is proximate to an antenna of the MMS (108a-n) includes modifying (510) (e.g., by the MMS (108a-n)) a transmission magnitude and transmission phase. For example, in some embodiments, a controller of the MMS (108a-n) may vary the capacitance of a varactor diode coupled to the metasurface (116a-n), thereby modifying the transmission magnitude and transmission phase of the metasurface (116a-n).

For further explanation, FIG. 6 sets forth a flow chart of another example method for adaptive multipath control within an electric vehicle battery pack according to embodiments of the present disclosure. The method of FIG. 6 is similar to FIG. 4 in that the method of FIG. 6 includes modifying (410) (e.g., by an MMS (108a-n)) at least one of: one or more transmission properties and/or one or more reflection properties of a metasurface (116a-n) of a MMS (108a-n) of a battery management system (110), wherein the metasurface (116a-n) is proximate to an antenna of the MMS (108a-n); and transmitting (420), via the antenna of the MMS (108a-n), battery sensor data.

The method of FIG. 6 differs from FIG. 4 in that modifying (410) (e.g., by an MMS (108a-n)) at least one of: one or more transmission properties and one or more reflection properties of a metasurface (116a-n) of a MMS (108a-n) of a battery management system (110), wherein the metasurface (116a-n) is proximate to an antenna of the MMS (108a-n) includes modifying (610) (e.g., by the MMS (108a-n)) a reflection magnitude and reflection phase. In some embodiments, a controller of the MMS (108a-n) may modify the reflection magnitude and reflection phase of the metasurface (116a-n) using a PIN diode coupled to the metasurface (116a-n). For example, the controller of the MMS (108a-n) may vary an on/off state or attenuated/unattenuated state of the PIN diode to modify the reflection magnitude and reflection phase.

In view of the explanations set forth above, readers will recognize that the benefits of adaptive multipath control within an electric vehicle battery pack according to embodiments of the present disclosure include, but are not limited to:

Improved performance of a wireless battery monitoring system by preventing antenna sitting in a local EM minima.

Advantages and features of the present disclosure can be further described by the following statements:

1. A method for adaptive multipath control within an electric vehicle battery pack, the method comprising: modifying at least one of: one or more transmission properties and one or more reflection properties of a metasurface of a module measurement system of a battery management system, wherein the metasurface is proximate to an antenna of the module measurement system; and transmitting, via the antenna of the module measurement system, battery sensor data.

2. The method of statement 1, wherein modifying at least one of: the one or more transmission properties and the one or more reflection properties of the metasurface comprises modifying a transmission magnitude and a transmission phase.

3. The method of statement 1 or 2, wherein the transmission magnitude and the transmission phase are modified by varying a capacitance of a varactor diode coupled to the metasurface.

4. The method of any of statements 1-3, wherein modifying at least one of: the one or more transmission properties and the one or more reflection properties of the metasurface comprises modifying a reflection magnitude and a reflection phase.

5. The method of any of statements 1-4, wherein the reflection magnitude and the reflection phase are modified by modulating a PIN diode coupled to the metasurface.

6. The method of any of statements 1-5, wherein the metasurface comprises an electro band-gap material comprising a plurality of unit cells.

7. The method of any of statements 1-6, wherein modifying at least one of the one or more transmission properties and the one or more reflection properties of the metasurface is performed in response to a failed transmission by the module measurement system.

8. The method of any of statements 1-7, wherein modifying at least one of: the one or more transmission properties and the one or more reflection properties of the metasurface is performed based on a predefined modulation pattern.

9. A battery management system for adaptive multipath control within an electric vehicle battery pack, comprising: a wireless network controller; and a module measurement system configured to perform steps comprising: modifying at least one of: one or more transmission properties and one or more reflection properties of a metasurface proximate to an antenna; and transmitting, via the antenna to the wireless network controller, battery sensor data.

10. The battery management system of statement 9, wherein modifying at least one of: the one or more transmission properties and the one or more reflection properties of the metasurface comprises modifying a transmission magnitude and transmission phase.

11. The battery management system of statement 9 or 10, wherein the transmission magnitude and the transmission phase are modified by varying a capacitance of a varactor diode coupled to the metasurface.

12. The battery management system of any of statements 9-11, wherein modifying at least one of one or more transmission properties and one or more reflection properties of the metasurface comprises modifying a reflection magnitude and reflection phase.

13. The battery management system of any of statements 9-12, wherein the reflection magnitude and the reflection phase are modified by modulating a PIN diode coupled to the metasurface.

14. The battery management system of any of statements 9-13, wherein the metasurface comprises an electro band-gap material comprising a plurality of unit cells.

15. The battery management system of any of statements 9-14, wherein modifying at least one of the one or more transmission properties and the one or more reflection properties of the metasurface is performed in response to a failed transmission by the module measurement system.

16. The battery management system of any of statements 9-15, wherein modifying at least one of the one or more transmission properties and the one or more reflection properties of the metasurface is performed based on a predefined modulation pattern.

17. An apparatus for adaptive multipath control within an electric vehicle battery pack, the apparatus comprising a computer processor, a computer memory operatively coupled to the computer processor, the computer memory having disposed within it computer program instructions that, when executed by the computer processor, cause the apparatus to carry out the steps of: modifying at least one of one or more transmission properties and one or more reflection properties of a metasurface of a module measurement system of a battery management system, wherein the metasurface is proximate to an antenna of the module measurement system; and transmitting, via the antenna of the module measurement system, battery sensor data.

18. The apparatus of statement 17, wherein modifying at least one of: the one or more transmission properties and the one or more reflection properties of the metasurface comprises modifying a transmission magnitude and transmission phase.

19. The apparatus of statements 17 or 18, wherein the transmission magnitude and the transmission phase is modified by varying a capacitance of a varactor diode coupled to the metasurface.

20. The apparatus of any of statements 17-19, wherein modifying at least one of the one or more transmission properties and the one or more reflection properties of the metasurface comprises modifying a reflection magnitude and a reflection phase.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for adaptive multipath control within an electric vehicle battery pack, the method comprising:
modifying at least one of: one or more transmission properties and one or more reflection properties of a metasurface of a module measurement system of a battery management system, wherein the module measurement system includes one or more battery sensors that generate battery sensor data; wherein the metasurface is proximate to an antenna of the module measurement system;
wherein the metasurface comprises an electro band-gap material comprising a plurality of unit cells; and
transmitting, via the antenna of the module measurement system, the battery sensor data.

2. The method of claim 1, wherein modifying at least one of: the one or more transmission properties and the one or more reflection properties of the metasurface comprises modifying a transmission magnitude and a transmission phase.

3. The method of claim 2, wherein the transmission magnitude and the transmission phase are modified by varying a capacitance of a varactor diode coupled to the metasurface.

4. The method of claim 1, wherein modifying at least one of: the one or more transmission properties and the one or more reflection properties of the metasurface comprises modifying a reflection magnitude and a reflection phase.

5. The method of claim 4, wherein the reflection magnitude and the reflection phase are modified by modulating a PIN diode coupled to the metasurface.

6. The method of claim 1, wherein modifying at least one of the one or more transmission properties and the one or more reflection properties of the metasurface is performed in response to a failed transmission by the module measurement system.

7. The method of claim 1, wherein modifying at least one of: the one or more transmission properties and the one or more reflection properties of the metasurface is performed based on a predefined modulation pattern.

8. A battery management system for adaptive multipath control within an electric vehicle battery pack, comprising:
   a wireless network controller; and
   a module measurement system that includes one or more battery sensors that generate battery sensor data, the module measurement system configured to
      modify at least one of: one or more transmission properties and one or more reflection properties of a metasurface proximate to an antenna; wherein modifying at least one of one or more transmission properties and one or more reflection properties of the metasurface comprises modifying a reflection magnitude and reflection phase; and
      transmit, via the antenna to the wireless network controller, the battery sensor data.

9. The battery management system of claim 8, wherein modifying at least one of: the one or more transmission properties and the one or more reflection properties of the metasurface comprises modifying a transmission magnitude and transmission phase.

10. The battery management system of claim 9, wherein the transmission magnitude and the transmission phase are modified by varying a capacitance of a varactor diode coupled to the metasurface.

11. The battery management system of claim 8, wherein the reflection magnitude and the reflection phase are modified by modulating a PIN diode coupled to the metasurface.

12. The battery management system of claim 8, wherein the metasurface comprises an electro band-gap material comprising a plurality of unit cells.

13. The battery management system of claim 8, wherein modifying at least one of the one or more transmission properties and the one or more reflection properties of the metasurface is performed in response to a failed transmission by the module measurement system.

14. The battery management system of claim 8, wherein modifying at least one of the one or more transmission properties and the one or more reflection properties of the metasurface is performed based on a predefined modulation pattern.

15. An apparatus for adaptive multipath control within an electric vehicle battery pack, the apparatus comprising a computer processor, a computer memory operatively coupled to the computer processor, the computer memory having disposed within it computer program instructions that, when executed by the computer processor, cause the apparatus to carry out the steps of:
   modifying at least one of one or more transmission properties and one or more reflection properties of a metasurface of a module measurement system of a battery management system, wherein the module measurement system includes one or more battery sensors that generate battery sensor data; wherein the metasurface is proximate to an antenna of the module measurement system;
   wherein modifying at least one of: the one or more transmission properties and the one or more reflection properties of the metasurface comprises modifying a transmission magnitude and transmission phase; and
   transmitting, via the antenna of the module measurement system, the battery sensor data.

16. The apparatus of claim 15, wherein the transmission magnitude and the transmission phase is modified by varying a capacitance of a varactor diode coupled to the metasurface.

17. The apparatus of claim 15, wherein modifying at least one of the one or more transmission properties and the one or more reflection properties of the metasurface comprises modifying a reflection magnitude and a reflection phase.

\* \* \* \* \*